United States Patent
Gioffreda et al.

(10) Patent No.: US 10,513,457 B2
(45) Date of Patent: *Dec. 24, 2019

(54) CERAMIC INK FOR AUTOMOTIVE GLASS

(71) Applicant: Prince Minerals Italy S.r.l., Filago (IT)

(72) Inventors: Fabio Gioffreda, Milan (IT); Bertocchi Ruggero, Capriate San Gervasio (IT)

(73) Assignee: Prince Minerals Italy S.r.l., Filago (IT)

(*) Notice: Subject to any disclaimer, the term of this patent is extended or adjusted under 35 U.S.C. 154(b) by 0 days.

This patent is subject to a terminal disclaimer.

(21) Appl. No.: 15/435,738

(22) Filed: Feb. 17, 2017

(65) Prior Publication Data
US 2017/0240459 A1  Aug. 24, 2017

Related U.S. Application Data

(60) Provisional application No. 62/296,773, filed on Feb. 18, 2016.

(51) Int. Cl.
*C03C 8/16* (2006.01)
*B41M 1/34* (2006.01)
(Continued)

(52) U.S. Cl.
CPC ............... *C03C 8/16* (2013.01); *B41M 1/12* (2013.01); *B41M 1/34* (2013.01); *B41M 7/0054* (2013.01); *C03C 3/066* (2013.01); *C03C 4/02* (2013.01); *C03C 4/10* (2013.01); *C03C 8/04* (2013.01); *C03C 8/14* (2013.01); *C03C 17/006* (2013.01); *C03C 17/23* (2013.01); *C09D 11/033* (2013.01); *C09D 11/037* (2013.01); *C03C 2204/00* (2013.01); *C03C 2218/32* (2013.01); *Y10T 428/24802* (2015.01)

(58) Field of Classification Search
CPC ........ B41M 1/12; B41M 1/34; B41M 7/0054; Y10T 428/24802
See application file for complete search history.

(56) References Cited

U.S. PATENT DOCUMENTS 5,443,669 A * 8/1995 Tunker ............ B32B 17/10036
156/102
6,171,383 B1  1/2001 Sakoske et al.
(Continued)

FOREIGN PATENT DOCUMENTS

WO  2013/023832 A1  2/2013

OTHER PUBLICATIONS

International Search Report and Written Opinion dated May 10, 2017, in corresponding International Application No. PCT/EP2017/053698 (12 pages).

*Primary Examiner* — Betelhem Shewareged
(74) *Attorney, Agent, or Firm* — Osha Liang LLP

(57) ABSTRACT

A ceramic ink may include about 20% to 80% by weight oxide frit, wherein the oxide frit is particles of at least one compound selected from silica, titania, alumina, zirconia, a compound having fluoride ion, bismuth oxide, zinc oxide, boron oxide, potassium oxide, sodium oxide, calcium oxide, barium oxide, lead oxide, lithium oxide, phosphorous oxide, molybdenum oxide, strontium oxide, and magnesium oxide; about 10% to 40% by weight infrared or near-infrared transmissive or reflective inorganic pigment; and about 10% to 40% vehicle.

12 Claims, 1 Drawing Sheet

(51) Int. Cl.

| | |
|---|---|
| *B41M 1/12* | (2006.01) |
| *B41M 7/00* | (2006.01) |
| *C03C 3/066* | (2006.01) |
| *C03C 4/10* | (2006.01) |
| *C03C 8/04* | (2006.01) |
| *C03C 8/14* | (2006.01) |
| *C03C 4/02* | (2006.01) |
| *C03C 17/00* | (2006.01) |
| *C03C 17/23* | (2006.01) |
| *C09D 11/033* | (2014.01) |
| *C09D 11/037* | (2014.01) |

(56) References Cited

U.S. PATENT DOCUMENTS

| | | | |
|---|---|---|---|
| 6,174,360 B1 | 1/2001 | Sliwinski et al. | |
| 6,503,316 B1 | 1/2003 | Sakoske et al. | |
| 2003/0044582 A1* | 3/2003 | Sakoske | B41M 1/12 428/195.1 |
| 2006/0260734 A1 | 11/2006 | Brown et al. | |
| 2013/0260301 A1* | 10/2013 | Yamauchi | B41M 3/14 430/105 |
| 2014/0370242 A1* | 12/2014 | Constantz | C01F 11/181 428/143 |
| 2015/0152238 A1* | 6/2015 | Kobayashi | C09D 7/61 106/453 |
| 2017/0240459 A1* | 8/2017 | Gioffreda | C03C 17/23 |
| 2018/0305245 A1* | 10/2018 | Conti | C03C 8/02 |

\* cited by examiner

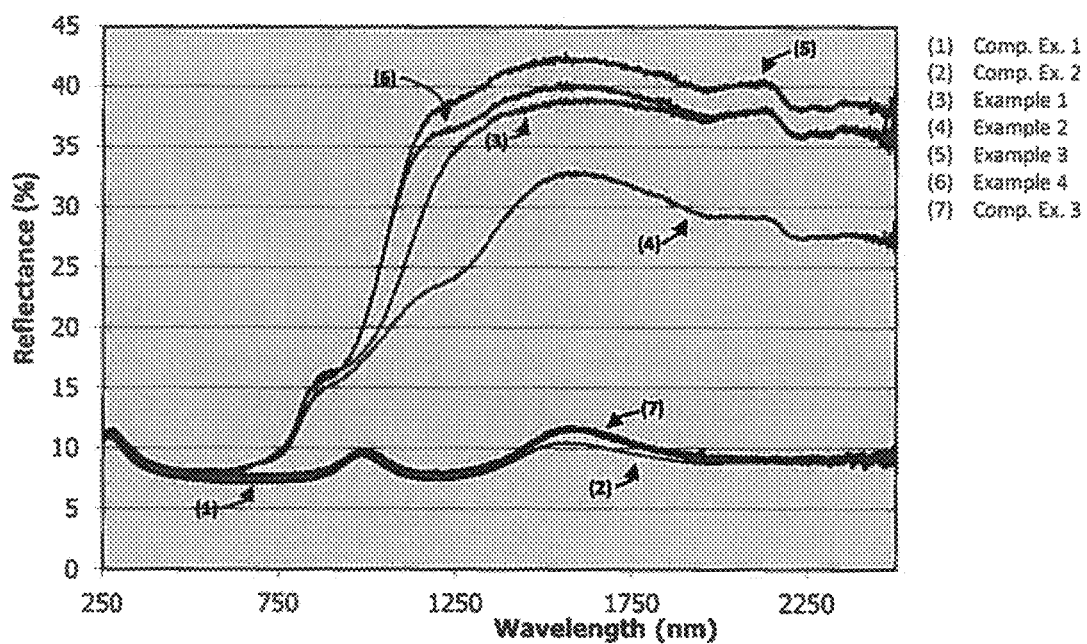

CERAMIC INK FOR AUTOMOTIVE GLASS

THE NAMES OF THE PARTIES TO A JOINT RESEARCH AGREEMENT

The subject matter of the present invention was made by or on behalf of the below listed parties to a joint research agreement. The joint research agreement was in effect on or before the date the present invention was made and the present invention was made as a result of activities undertaken within the scope of the joint research agreement. The parties to the joint research agreement are: 1) Prince Minerals Limited, Great Britain, of which Prince Minerals Italy S.r.l, is a wholly owned subsidiary; and 2) Pilkington Group Limited, Great Britain.

BACKGROUND

Ceramic enamel compositions, also known as ceramic inks, find use in a variety of industries, where they are employed for purely decorative to highly functional purposes. For example, the automotive industry utilizes black ceramic enamel compositions, often applied by screen printing technology, to generate the dark enamel bands on the peripheral edges of automotive glass or glazings. After their application to an automotive glazing, the ceramic enamel compositions are fired or otherwise heated to temperatures capable of fusing the compositions to the automotive glazing, thereby forming a dense, hard, and durable protective layer that is securely attached to the automotive glazing.

The dark enamel bands formed by ceramic enamel compositions are also referred to as obscuration bands and are commonly found on the peripheral edges of the windshield, sunroof, and side and rear windows. In addition to improving the overall aesthetic of the vehicle by concealing unsightly wires and/or adhesives that may be used with the otherwise transparent automotive glazings, obscuration bands also serve to block the transmission of sunlight through the glazings, thereby protecting the adhesives thereunder from photo-degradation processes initiated by ultraviolet radiation.

Unfortunately, the dark enamel obscuration bands may result in hazy or otherwise optically distorted area that may limit the readability of heads-up displays. Accordingly, there exists a need for new compositions that may be used for the improvement of the properties of ceramic enamel compositions.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a ceramic ink that includes an oxide frit; at least one infrared or near-infrared transmissive, or reflective inorganic pigment; and a vehicle.

In another aspect, embodiments disclosed herein relate to a substrate bearing a fired ceramic ink, the fired ceramic ink including an oxide frit fused with at least one infrared or near-infrared transmissive or reflective inorganic pigment.

In yet another aspect, embodiments disclosed herein relate to a substrate bearing a fired ceramic ink prepared by a process that includes applying a ceramic ink including an oxide frit; at least one infrared or near-infrared transmissive or reflective inorganic pigment; and a vehicle to at least a portion of a substrate to form a coated substrate; and firing the coated substrate.

Other aspects and advantages of the claimed subject matter will be apparent from the following description and the appended claims.

BRIEF DESCRIPTION OF DRAWINGS

FIG. 1 depicts spectrographs of films created by ceramic inks containing inorganic pigments.

DETAILED DESCRIPTION

Embodiments disclosed herein relate generally to ceramic enamel compositions to reduce or eliminate the optical distortion, known in the industry as a "burnline", often seen in automotive glazings in the vicinity of the boundary between an obscuration band and the transparent portion of the automotive glazing. The hemline effect is believed to be caused by the heat differential that occurs around the interface of the dark, heat absorbing, obscuration band and the uncoated transparent area of the automotive glazing. In effect, it is believed that the significant absorption of solar radiation, and its subsequent conversion to thermal energy, by conventionally used inorganic pigments in the protective obscuration bands creates a large heat gradient that leads to the optical distortion observed in the burnline area.

With the advent of heads-up display (HUD) technology being incorporated into automobiles at an ever growing rate, a need exists to provide new concepts to reduce or eliminate the burnline currently manifested by obscuration bands created using existing ceramic enamel compositions. The HUD technology that is being incorporated into automobiles essentially allows for the display of relevant information (e.g., speed, time, incoming phone/text messages, performance alerts, etc.) on a transparent area of the glazing without requiring the user/driver to change their typical viewpoint (i.e., it allows a user/driver to maintain their view of the road and other immediate surroundings while in motion), thereby delivering pertinent information while also maintaining a high level of safety by decreasing the possibility for distraction. Because it is often preferred/necessary to display the information shown by the HUD in or near the burnline area of the glazing, the information can be optically distorted and difficult to read in conventional glazings.

Whereas, prior ceramic ink compositions used for obscuration bands indicate that any of a multitude of black inorganic pigments may be used, in order to eliminate or minimize optical distortion within the burnline, the present disclosure presents ceramic enamel or ink compositions that utilize inorganic pigments that possess infrared (i.e., radiation having wavelengths between about 700 nm to 1 mm) transmittance or reflectance properties. In more specific embodiments, the ceramic ink compositions of this disclosure utilize inorganic pigments that possess near-infrared (i.e., radiation having wavelengths between about 700 nm to 2500 nm) transmittance or reflectance properties. In even more specific embodiments, the ceramic ink compositions of this disclosure utilize inorganic pigments that possess near-infrared (i.e., radiation having wavelengths between about 700 nm to 2500 nm) reflectance properties. For example, a film created by the ceramic ink composition or the inorganic pigment used therein may reflect greater than about 15% of light at a wavelength of greater than about 875 nm, such as reflecting 15% to 50% of light at wavelengths between about 875 nm and 2500 nm. In some embodiments, a film created by the ceramic ink composition or the inorganic pigment used therein may reflect greater than about 20% of light at a wavelength of greater than about 1125 nm, such as reflecting 20% to 50% of light at wavelengths between about 1125 nm and 2500 nm. In some embodiments, a film created by the ceramic ink composition or the inorganic pigment used therein may reflect greater than about 30% of light at a wavelength of greater than about 1125 nm, such as reflecting 30% to 50% of light at wavelengths between about 1125 and 2500. In some embodiments, a film created by the ceramic ink composition or the inorganic pigment used therein may reflect greater than about 35% of light at a wavelength of greater than about 1250 nm, such as reflecting 35% to 45% of light at wavelengths between about 1250 nm and 2500 nm.

Conventional ceramic ink compositions for obscuration bands are not taught to possess reflective optical properties and are only taught to be formulated with a multitude of black inorganic pigments as long as the obscuration band has an opacity that limits the UV light transmission to below 0.1% in order to protect the adhesive sealant holding the automotive glazing in place. Without being bound by theory, it is believed that by using inorganic pigments having reflective or transmissive characteristics at wavelengths between about 700 nm to 1 mm, the absorption of radiation by the inorganic pigments present in the obscuration band is greatly reduced. Thus, by its transmittance or reflectance, less of the radiation is converted to heat leading to a significantly smaller temperature differential in the vicinity of the boundary between an obscuration band and the transparent portion of the automotive glazing.

In one or more embodiments of this disclosure, the ceramic inks are a mixture of inorganic pigments and finely ground glass particles, called a frit, typically suspended in a vehicle or carrier composition that aids in the uniform application of the pigment and frit to the substrate surface upon which it is applied. After its application to an appropriate substrate the ceramic ink is fused together and to the substrate by a calcining or firing process that typically involves temperatures from about 400° C. to 1450° C., such as from 500° C. to 800° C. A high firing temperature may be necessary in order to fuse and form a strong bond between the inorganic pigments, frit, and substrate. During the firing process, the vehicle or carrier vaporizes or burns off to leave behind the solid components of the ceramic ink composition. In one or more embodiments, the substrate may be an automotive glazing.

In one or more embodiments, the ceramic ink comprises at least one infrared or near-infrared transmissive or reflective inorganic pigments. As properties of materials may differ at different temperatures, the infrared or near-infrared transmissive or reflective inorganic pigments useful in the present disclosure possesses these properties at temperatures from about −30° C.-800° C., or from about −10° C. to 250° C., or from about 0° C. to 140° C. Thus, the near-infrared transmissive or reflective inorganic pigments may have the desired optical properties over a portion of or the entire working range for the ceramic ink and enamel compositions, including when used in automobiles or other vehicles, which may experience temperatures exceeding typical atmospheric temperatures during normal use. Notable examples of infrared or near-infrared reflective inorganic pigments matching the characteristics described above are chromium-iron oxide (CAS No. 12737-27-8), chromium-iron-nickel oxide (CAS No. 71631-15-7), and chromium green-black hematite (CAS No. 68909-79-5). In one or more embodiments, the infrared or near-infrared transmissive or reflective inorganic pigments may be included in the ceramic inks in an amount of about 0.1% to 50% by weight, or about 1% to 45% by weight, or about 5% to 40% by weight, or about 10% to 35% by weight, or about 15% to 30% by weight. In yet other embodiments, the infrared or near-infrared transmissive or reflective inorganic pigments may be included in the ceramic inks in an amount in the range from about 10% to about 40% by weight, such as from about 20% to about 30% by weight, or from about 22% to about 28% by weight.

In some embodiments, the ceramic inks may also comprise conventional infrared absorbing inorganic pigments (i.e., those which absorb radiation across the infrared range) in amounts that do not substantially increase the absorption of infrared or near infrared radiation, thereby maintaining the low temperature differential provided by the use of the infrared or near-infrared transmissive or reflective inorganic pigments. For example, small amounts of conventional infrared absorbing inorganic pigment may be useful to preserve the traditional and expected appearance of the darkly colored obscuration bands, while not significantly diminishing the reflectance obtained by the infrared or near-infrared reflective inorganic pigments included therein. In this way, a minimum overall infrared or near-infrared reflectance may be sustained for enamels produced with the ceramic ink composition as discussed above.

Notable examples of conventional inorganic pigments that strongly absorb infrared or near-infrared radiation include copper chromite black, cobalt chromium iron black, and nickel manganese iron chromium black. In one or more embodiments, the conventional infrared absorbing inorganic pigments may be included the ceramic ink composition in an amount from about 0.1% to 50% by weight, or from about, 0.5% to 40% by weight, or from about 1% to 30% by weight, or from about 1.5% to 20% by weight, or from about 2% to 10% by weight, or from about 2.5% to 7.5% by weight.

In one or more embodiments, the ceramic ink comprises at least one oxide frit. The oxide frit may be free of lead or cadmium so as to meet environmental and health considerations. In one or more embodiments, the oxide frit may include particles of at least one compound selected from silica, titanic, alumina, zirconia, compounds having fluoride ion (e.g., fluorite, fluorapatite, cryolite, etc.), bismuth oxide, zinc oxide, boron oxide, potassium oxide, sodium oxide, calcium oxide, barium oxide, lead oxide, lithium oxide, phosphorous oxide, molybdenum oxide, strontium oxide, and magnesium oxide. In some embodiments, multiple oxide frits may be blended and/or the particle size of the oxide frits may be controlled in order to achieve desired properties (e.g. melt temperature). For example, in some embodiments, the oxide flit used may use particles with sizes of less than 20 micron. Further, a $D_{50}$ value for the oxide frit may range from about 2 micron to 6 micron. In one or more embodiments, the oxide frit may be included in the ceramic ink composition in an amount of about 20% to 80% by weight, or about 30% to 70% by weight, or about 40% to 60% by weight.

In general, when silica is included in the oxide frit it may be included in an amount from about 1% to 60% by weight, or from about 5% to 55% by weight, or from about 10% to 45% by weight, or from about 15% to 35% by weight, or from about 18% to 28% by weight.

In general, when bismuth oxide is included in the oxide frit it may be included in an amount from about 5% to 75% by weight, or from about 10% to 70% by weight, or from about 15% to 65% by weight, or from about 18% to 62% by weight.

In general, when compounds having fluoride ion are included in the oxide frit they may be included in an amount ranging from about 0.1% to 5 percent by weight, or from about 0.5% to 4% by weight, or from about 1% to 3% by weight.

In general, when zinc oxide is included in the oxide frit it may be included in an amount ranging from about 0.1% to 60% by weight, or from about 0.5% to 55% by weight, or from about 0.75% to 50% by weight, or from about 1% to about 45% by weight, or from about 1.25% to about 40% by weight, or from about 1.5% to about 30% by weight, or from about 1.75% to about 20% by weight or from about 2% to about 10% by weight, or from about 2.25% to about 8% by weight.

In general, when potassium oxide is included in the oxide hit it may be included in an amount ranging from about 0.1% to 5 percent by weight, or from about 0.5% to 4% by weight, or from about 1% to 3% by weight.

In general, when sodium oxide is included in the oxide frit it may be included in an amount ranging from about 1% to about 20% by weight, or from about 1.25% to about 15% by weight or from about, 1.5% to about 10% by weight, or from about 2% to about 5% by weight.

In general, when lithium oxide is included in the oxide frit it may be included in an amount ranging from about 0.1% to 5 percent by weight, or from about 0.5% to 4.5% by weight, or from about 1% to 4% by weight.

In general, when zirconia is included in the oxide frit it may be included in an amount ranging from about 0.1% to 15% by weight, or from about 0.25 to 10% by weight, or from about 0.5 to 5% by weight.

In general, when titanic is included in the oxide frit it may be included in an amount ranging from about 0.1% to 15% by weight, or from about 0.5 to 12% by weight, or from about 1 to 10% by weight.

In general, when strontium oxide is included in the oxide frit it may be included in an amount ranging from about 0.1% to 5% by weight, or from about 0.25 to 2.5% by weight, or from about 0.5 to 2% by weight.

In general, when calcium oxide is included in the oxide frit it may be included in an amount ranging from about 0.1% to 5 percent by weight, or from about 0.5% to 4% by weight, or from about 1% to 3% by weight.

In general, when magnesium oxide is included in the oxide frit it may be included in an amount ranging from about 0.1% to 5% by weight, or from about 0.25 to 2.5% by weight, or from about 0.5 to 2% by weight.

In general, when molybdenum oxide is included in the oxide frit it may be included in an amount ranging from about 0.1% to 5% by weight, or from about 0.25 to 2.5% by weight, or from about 0.5 to 2% by weight.

In general, when phosphorous oxide is included in the oxide frit it may be included in an amount ranging from about 0.1% to 5 percent by weight, or from about 0.5% to 4% by weight, or from about 1% to 3% by weight.

In general, when alumina is included in the oxide frit it may be included in an amount ranging from about 0.1% to 5 percent by weight, or from about 0.5% to 4% by weight, or from about 1% to 3% by weight.

In general, when boron oxide is included in the oxide frit it may be included in an amount ranging from about 0.1% to 40% by weight, or from about 1% to 35% by weight, or from about 2.5% to about 30% by weight, or from about 5% to about 25% by weight, or from about 7.5% to about 20% by weight, or from about 10% to about 15% by weight.

It is the express purpose of including the above compound specific weight percent ranges in this disclosure so that any of the values included within the range for a specific compound may be combined with any other value included within the range for said compound to create a more defined weight percent range. Furthermore, multiple compounds may be included within an oxide frit according to this disclosure as long as their relative amounts fall within the weight percent ranges disclosed above or a more defined weight percent range that may be any of the values included within the range for a specific compound combined with any other value included within the range for said compound.

In one or more embodiments, the frit is a zinc-based frit comprising zinc oxide and at least one of silica, compounds having fluoride ion, potassium oxide, sodium oxide, lithium oxide, zirconia, titanic, strontium oxide, calcium oxide, magnesium oxide, molybdenum oxide, phosphorous oxide, alumina, and boron oxide. For example, in some embodiments the zinc-based kit may include about 5% to 55% by weight silica, about 0% to 5% by weight fluorine containing compounds, about 10% to 50% by weight zinc oxide, about 0% to 5% by weight potassium oxide, about 0 to 15% by weight sodium oxide, about 0% to 4% by weight lithium oxide, about 0% to 10% by weight zirconia, about 0% to 10% by weight titanic, about 0% to 2% by weight strontium oxide, about 0% to 5% by weight calcium oxide, about 0% to 2% by weight magnesium oxide, about 0% to 2% by weight molybdenum oxide, about 0% to 5% by weight phosphorous oxide, about 0% to 5% by weight alumina, and about 10% to 28% by weight boron oxide.

For example, a zinc-based frit may be formulated according to Embodiments 1-3 shown in Table 1 below.

TABLE 1

| Component | Embodiment 1 (wt. %) | Embodiment 2 (wt. %) | Embodiment 3 (wt. %) |
| --- | --- | --- | --- |
| $SiO_2$ | 1-60 | 5-55 | 10-45 |
| $Bi_2O_3$ | — | — | — |
| Fluoride ion containing compounds | 0-5 | 0.5-4 | 1-3 |
| ZnO | 0.1-60 | 0.5-55 | 0.75-50 |
| $K_2O$ | 0-5 | 0.5-4 | 1-3 |
| $Na_2O$ | 0-20 | 1.25-15 | 2-5 |
| $Li_2O$ | 0-5 | 0.5-4.5 | 1-4 |
| $ZrO_2$ | 0-15 | 0.25-10 | 0.5-5 |
| $TiO_2$ | 0-15 | 0.5-12 | 1-10 |
| SrO | 0-5 | 0.25-2.5 | 0.5-2 |
| CaO | 0-5 | 0.5-4 | 1-3 |
| MgO | 0-5 | 0.25-2.5 | 0.5-2 |
| $MoO_3$ | 0-5 | 0.25-2.5 | 0.5-2 |
| $P_2O_5$ | 0-5 | 0.5-4 | 1-3 |
| $Al_2O_3$ | 0-5 | 0.5-4 | 1-3 |
| $B_2O_3$ | 0.1-40 | 2.5-30 | 10-15 |

In one or more embodiments, the frit is a bismuth-based frit comprising bismuth oxide and at least one of silica, zinc oxide, compounds having fluoride ion, potassium oxide, sodium oxide, lithium oxide, zirconia, titania, strontium oxide, calcium oxide, magnesium oxide, molybdenum oxide, phosphorous oxide, alumina, and boron oxide. For example, in some embodiments the bismuth-based flit may include about 3% to 40% by weight silica, 10% to 65% by weight bismuth oxide, 0% to 5% by weight fluorine containing compounds, 0% to 20% by weight zinc oxide, 0% to 5% by weight potassium oxide, 0 to 8% by weight sodium oxide, 0% to 4% by weight lithium oxide, 0% to 6% by weight zirconia 0% to 10% by weight titania, 0% to 2% by weight strontium oxide, 0% to 5% by weight calcium oxide, 0% to 2% by weight magnesium oxide, 0% to 2% by weight molybdenum oxide, 0% to 5% by weight phosphorous oxide, 0% to 5% by weight alumina, and 2% to 20% by weight boron oxide. In other embodiments the bismuth-based frit may include about 10% to 30% by weight silica, 40% to 65% by weight bismuth oxide, 1% to 10% by weight zinc oxide, 0.05% to 2% by weight potassium oxide, 1% to 6% by weight sodium oxide, 0.05% to 2% by weight zirconia, 0.5% to 5% by weight alumina, and 6% to 16% by weight boron oxide. In yet other embodiments the bismuth-based frit may include about 13% to 23% by weight silica, 50% to 65% by weight bismuth oxide, 2% to 6% by weight zinc oxide, 0.05% to 0.5% by weight potassium oxide, 2% to 5% by weight sodium oxide, 0.1% to 1% by weight zirconia, 1% to 4% by weight alumina, and 8% to 15% by weight boron oxide.

For example, a bismuth-based flit may be formulated according to Embodiments 4-6 shown in Table 2 below.

TABLE 2

| Component | Embodiment 4 (wt. %) | Embodiment 5 (wt. %) | Embodiment 6 (wt. %) |
|---|---|---|---|
| $SiO_2$ | 1-60 | 10-45 | 18-28 |
| $Bi_2O_3$ | 5-75 | 10-70 | 18-62 |
| Fluoride ion containing compounds | 0-5 | 0.5-4 | 1-3 |
| ZnO | 0.1-60 | 1-45 | 1.75-20 |
| $K_2O$ | 0-5 | 0.5-4 | 1-3 |
| $Na_2O$ | 0-20 | 1.5-10 | 2-5 |
| $Li_2O$ | 0-5 | 0.5-4.5 | 1-4 |
| $ZrO_2$ | 0-15 | 0.25-10 | 0.5-5 |
| $TiO_2$ | 0-15 | 0.5-12 | 1-10 |
| SrO | 0-5 | 0.25-2.5 | 0.5-2 |
| CaO | 0-5 | 0.5-4 | 1-3 |
| MgO | 0-5 | 0.25-2.5 | 0.5-2 |
| $MoO3$ | 0-5 | 0.25-2.5 | 0.5-2 |
| $P_2O_5$ | 0-5 | 0.5-4 | 1-3 |
| $Al_2O3$ | 0-5 | 0.5-4 | 1-3 |
| $B_2O_3$ | 0.1-40 | 2.5-30 | 7.5-20 |

In one or more embodiments, the ceramic ink comprises a vehicle or carrier that is used to suspend the inorganic pigment and oxide frit so that they may be applied evenly and uniformly to the substrate surface prior to firing. In addition to adequately suspending the particulates (e.g, the oxide frit and the inorganic pigment), the vehicle must burn off completely or be otherwise removed upon firing. In one or more embodiments, the vehicle or carrier may be included in the ceramic ink composition in an amount of about 10% to 40% by weight, or about 15% to 35% by weight, or about 20% to 30% by weight.

In one or more embodiments, the vehicle is an organic solvent such as 2,2,4-trimethyl pentanedial monoisobutyrate; alpha-terpineol; beta terpineol; gamma terpineol; tridecyl alcohol; diethylene glycol ethyl ether, diethylene glycol butyl ether; pine oils, vegetable oils, mineral oils, low molecular weight petroleum fractions, tridecyl alcohols, synthetic or natural resins (e.g., cellulosic resins or acrylate resins), PM (propylene glycol mono methyl ether), DPM (dipropylene glycol mono methyl ether), TPM (tripropylene glycol mono methyl ether), PnB (propylene glycol mono n-butyl ether), DPnB (dipropylene glycol mono butyl ether), TPNB (tripropylene glycol mono n-butyl ether), PnP (propylene glycol mono propyl ether), DPnP (dipropylene glycol mono propyl ether), TPNB-H (propylene glycol butyl ether), PMA (propylene glycol mono methyl ether acetate), Dowanol DB (Diethylene glycol mono butyl ether, available from (Dow Chemical Company, USA)) or other ethylene or propylene glycol ethers. In some embodiments, the vehicle may also be a mixture of two or more different organic solvents.

Further, the ceramic ink compositions may include wetting agents, dispersants, levelling agents, rheological modifiers, etc. as is known in the art to modulate the properties of the ceramic ink compositions and/or the enamel films resulting from their firing.

EXAMPLES

Enamel films were created by screen printing ceramic ink compositions containing either an infrared reflective inorganic pigment according to the present disclosure or an infrared absorbing conventional inorganic pigment. Table 3 presents details of the frit used for Examples 14 and Comparative Examples 1-3.

TABLE 3

| Component | (wt. %) | Variance (wt. %) |
|---|---|---|
| $SiO_2$ | 19.92 | ±5 |
| $Bi_2O_3$ | 59.12 | ±1 |
| ZnO | 2.73 | ±2 |
| $K_2O$ | 0.14 | ±0.5 |
| $Na_2O$ | 3.09 | ±3 |
| $ZrO_2$ | 0.86 | ±0.5 |
| $Al_2O_3$ | 2.14 | ±2 |
| $B_2O_3$ | 10.76 | ±5 |

Each ink formulation used in the Examples contained 59.7 wt. % (±5 wt. %) frit, 23.3 wt. % (±3 wt. %) pigment, and 17 wt. % (±2 wt %) vehicle. In Example 3 and Example 4 the pigment used was chromium-iron oxide (CAS # 12737-27-8). In Example 1 and Example 2 the pigment used was chromium green black hematite (CAS # 68909-75-51).

In Examples 2 and 4, films were prepared by a screen printing process using a 100 threads/cm$^2$ screen to print a ceramic ink composition including a frit and an infrared reflective inorganic pigment, both in accordance with the present disclosure. A 20-25 micron thick film resulted from this printing. In Examples 1 and 3, films were prepared by a screen printing process using a 77 threads/cm$^2$ screen to print a ceramic ink composition including a frit and an infrared reflective inorganic pigment, both in accordance with the present disclosure. A 26-30 micron thick film resulted from this printing.

Comparative Examples 1-3 are films prepared with ceramic inks containing conventional infrared absorbing inorganic pigments. In Comparative Examples 1 and 2 the conventional inorganic pigment used was copper chromium (CAS #68186-914) and the inorganic pigment used in Comparative Example 3 is a commercially available standard black pigment. Comparative Examples 2 and 3 were prepared by a screen printing process using a 77 threads/cm$^2$ screen to print a ceramic ink composition including a frit and a conventional infrared absorbing inorganic pigment. A 26-30 micron thick film resulted from this printing. Comparative Example 1 was prepared by a screen printing process using a 100 threads/cm$^2$ screen to print a ceramic ink composition including a frit and a conventional infrared absorbing inorganic pigment. A 20-25 micron thick film resulted from this printing.

As stated above, a compositionally similar flit to that which was used in Examples 1-4 was used in each of the comparative examples. In each example, the same vehicle was used, which included glycol and glycol ethers as well as a cellulosic resin. Thus, the only variable changed between Examples 1-4 and Comparative Examples 1-3 (outside of the film thickness differences indicated above for each example) was the use of an infrared reflective inorganic pigment in Examples 1-4 versus the use of an infrared absorbing pigment in Comparative Examples 1-3

FIG. 1 depicts spectrographs of films created by ceramic inks containing inorganic pigments according to the present disclosure, the inorganic pigments possessing light reflective properties. FIG. 1 also depicts spectrographs of the three comparative examples of conventional ceramic ink compositions. The spectrographs show that the films formed using ceramic inks with conventional inorganic pigments do not reflect infrared radiation nearly as well as films formed using ceramic inks according to the present disclosure.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A ceramic ink comprising:
   an oxide fit;
   at least one infrared or near-infrared transmissive or reflective inorganic pigment, wherein the at least one infrared or near-infrared transmissive or reflective inorganic pigment reflects 15 to 50% of light at a wavelength of greater than about 875 nm; and
   a vehicle.

2. The ceramic ink according to claim 1, wherein the oxide frit is particles of at least one compound selected from silica, titania, alumina, zirconia, a compound having fluoride ion, bismuth oxide, zinc oxide, boron oxide, potassium oxide, sodium oxide, calcium oxide, barium oxide, lead oxide, lithium oxide, phosphorous oxide, molybdenum oxide, strontium oxide, and magnesium oxide.

3. The ceramic ink according to claim 1, wherein the ceramic ink comprises:
   about 20% to 80% by weight oxide frit;
   about 10% to 40% by weight infrared or near-infrared transmissive or reflective inorganic pigment; and
   about 10% to 40% vehicle.

4. The ceramic ink according to claim 1, wherein the at least one infrared or near-infrared transmissive or reflective inorganic pigment is selected from the group comprising:
   chromium-iron oxide, chromium-iron-nickel-oxide, and chromium green-black hematite.

5. The ceramic ink according to claim 1, wherein the at least one infrared or near-infrared transmissive or reflective inorganic pigment reflects greater than about 20% of light at a wavelength of greater than about 1125 nm.

6. The ceramic ink according to claim 1, wherein the at least one infrared or near-infrared transmissive or reflective inorganic pigment reflects greater than about 30% of light at a wavelength of greater than about 1125 nm.

7. The ceramic ink according to claim 1, wherein the at least one infrared or near-infrared transmissive or reflective inorganic pigment reflects greater than about 35% of light at a wavelength of greater than about 1250 nm.

8. The ceramic ink according to claim 1, wherein the vehicle comprises an organic solvent.

9. The ceramic ink according to claim 1, wherein the oxide frit is a zinc-based oxide frit.

10. The ceramic ink according to claim 9, wherein the zinc-based oxide frit comprises:
    about 5% to 55% by weight silica;
    about 0% to 5% by weight fluorine containing compounds;
    about 10% to 50% by weight zinc oxide;
    about 0% to 5% by weight potassium oxide;
    about 0 to 15% by weight sodium oxide;
    about 0% to 4% by weight lithium oxide;
    about 0% to 10% by weight zirconia;
    about 0% to 10% by weight titania;
    about 0% to 2% by weight strontium oxide;
    about 0% to 5% by weight calcium oxide;
    about 0% to 2% by weight magnesium oxide;
    about 0% to 2% by weight molybdenum oxide;
    about 0% to 5% by weight phosphorous oxide;
    about 0% to 5% by weight alumina; and
    about 10% to 28% by weight boron oxide.

11. The ceramic ink according to claim 1, wherein the oxide frit is a bismuth-based oxide fit.

12. The ceramic ink according to claim 11, wherein the bismuth-based oxide frit comprises:
    about 3% to 40% by weight silica;
    about 10% to 65% by weight bismuth oxide;
    about 0% to 5% by weight fluorine containing compounds;
    about 0% to 20% by weight zinc oxide;
    about 0% to 5% by weight potassium oxide;
    about 0 to 8% by weight sodium oxide;
    about 0% to 4% by weight lithium oxide;
    about 0% to 6% by weight zirconia;
    about 0% to 10% by weight titania;
    about 0% to 2% by weight strontium oxide;
    about 0% to 5% by weight calcium oxide;
    about 0% to 2% by weight magnesium oxide;
    about 0% to 2% by weight molybdenum oxide;
    about 0% to 5% by weight phosphorous oxide;
    about 0% to 5% by weight alumina; and
    about 2% to 20% by weight boron oxide.

* * * * *

UNITED STATES PATENT AND TRADEMARK OFFICE
CERTIFICATE OF CORRECTION

PATENT NO.         : 10,513,457 B2
APPLICATION NO.    : 15/435738
DATED              : December 24, 2019
INVENTOR(S)        : Fabio Gioffreda et al.

It is certified that error appears in the above-identified patent and that said Letters Patent is hereby corrected as shown below:

In the Specification

At Column 3, Line number 55, "-30° C.-800° C." should read -- -30° C. to 800° C. --.

At Column 4, Line number 51, "flit" should read -- frit --.

At Column 5, Line number 32, "titanic" should read -- titania --.

At Column 6, Line number 17, "zinc-based kit" should read -- zinc-based frit --.

At Column 6, Line number 58, "flit" should read -- frit --.

At Column 7, Line number 15, "flit" should read -- frit --.

At Column 8, Line number 64, "flit" should read -- frit --.

In the Claims

At Column 9, Claim number 1, Line number 25, "fit" should read -- frit --.

At Column 10, Claim number 11, Line number 33, "fit" should read -- frit --.

Signed and Sealed this
Eighteenth Day of February, 2020

Andrei Iancu
*Director of the United States Patent and Trademark Office*